United States Patent

[11] 3,590,267

[72] Inventor Chandra K. N. Patel
 Chatham, N.J.
[21] Appl. No. 799,677
[22] Filed Feb. 17, 1969
[45] Patented June 29, 1971
[73] Assignee Bell Telephone Laboratories Incorporated
 Murray Hill, N.J.

[54] COHERENT OPTICAL OSCILLATOR EMPLOYING TUNABLE MIXED EXCITATIONS
10 Claims, 3 Drawing Figs.

[52] U.S. Cl. .................................................. 307/88.3,
 321/69, 331/107
[51] Int. Cl. .................................................. H03f 7/00
[50] Field of Search ........................................ 307/88.3;
 321/69; 331/107

[56] References Cited
OTHER REFERENCES
Scott et al., PHYSICAL REVIEW, Oct. 15, 1967, pp. 834—840.

Primary Examiner—John Kominski
Assistant Examiner—Darwin R. Hostetter
Attorneys—R. J. Guenther and Arthur J. Torsiglieri ABSTRACT: A coherent optical Raman oscillator employing a semiconducting crystal having simultaneously Raman active and infrared-active phonons is disclosed in which mixed excitations called polaritons or plasmaritons scatter light substantially in the forward direction and in which the scattered light is resonated along an axis substantially collinear with the pump propogation and simultaneously is tuned by changing the carrier concentration or an applied magnetic field to maintain the required phase-matching to the pump and the mixed excitation. Carrier concentration can be changed by two-photon absorption or current injection.

| CURVES | SAMPLE CARRIER CONCENTRATION |
|---|---|
| 31 | SEMI-INSULATING |
| 32 | $6.7 \times 10^{16} cm^{-3}$ |
| 33 | $1.4 \times 10^{17} cm^{-3}$ |
| 34 | $2.9 \times 10^{17} cm^{-3}$ |

——— FIELD (100 kOe)
——— NO FIELD
—·—·— DEVIATION FROM FORWARD DIRECTION

COHERENT OPTICAL OSCILLATOR EMPLOYING TUNABLE MIXED EXCITATIONS

BACKGROUND OF THE INVENTION

In the coherent optical device art, a highly desirable sort of device is one that is continuously tunable over a broad band of frequencies. Moreover, among tunable devices the most desirable are those in which the tuning requires no mechanical adjustment.

In particular, future optical communication systems may need broadly tunable local oscillator sources, particularly for optical superheterodyne systems analogous to present-day radio systems.

Several field-tunable optical oscillator devices have previously been proposed. In particular, one of the more attractive is that disclosed in the copending U.S. Pat. application of P. A. Fleury and J. M. Worlock, Ser. No. 670,295, filed Sept. 25, 1967, and assigned to the assignee hereof. The devices there disclosed employ electrical field tuning of a so-called soft phonon mode, a crystalline lattice vibration that is variable with temperature or electric field. While this system is attractive and has many advantages, tunable optical devices employing stronger scattering effects or nonlinear effects would be desirable.

Other tunable coherent optical devices have also been proposed; but none combine the advantages of strong effects and tunability.

One of the stronger scattering effects observed in prior Raman-scattering experiments is the so-called polariton scattering. A polariton is a combination of excitations within a crystal and may be considered to include a propagating photon and a transverse optical phonon having nearly the same momenta and energy in a crystal. A transverse optical phonon is a lattice vibration in which adjacent atoms move in opposite directions orthogonal to the direction of propagation of the energy of the vibration. Typically, the strong scattering effects are obtained under conditions of phase-matching. In other words, the Raman-scattered light propagates in the same direction as the pumping light and with a frequency and phase relation to the pumping light that provides continuous power transfer therefrom throughout an extended pathlength. In order for the pumping light and the Raman-scattered light to propagate in the same direction under these conditions, typically only one scattered light frequency is feasible for a given pumping frequency. While some tunability is achievable with noncollinear phase-matching, this technique reduces the interaction volume. No tunability is possible without destroying either collinearity, phase-matching, or adversely affecting the interaction volume.

SUMMARY OF THE INVENTION

I have discovered that the strong scattering effects of coherent optical devices employing polariton effects can be obtained in a tunable coherent optical device by modifying the frequency of the mixed excitation (hereinafter called a polariton), either by changing the carrier concentration or an applied magnetic field. Whereas the prior proposals employing polaritons have suggested insulating crystals having essentially no free carriers, I have recognized and verified the significant advantages afforded by a substantial concentration of free carriers. Thus, the crystals employed in my invention are semiconducting, and their optic phonons are simultaneously infrared active and Raman active.

I have discovered substantial tunability in optical Raman-scattering devices in which mixed excitations called polaritons or plasmaritons scatter light substantially in the forward direction and in which that scattered light is resonated along an axis substantially collinear with the direction of propagation of the pump light and simultaneously is tuned by changing the carrier concentration or an applied magnetic field or both to change the frequency of the mixed excitation from which scattering occurs.

In specific embodiments of my invention carrier concentration is changed by current injection, for which techniques are well known in the semiconductor art, or by two-photon absorption.

I have investigated the tunability of the forward scattering both experimentally and theoretically in samples of gallium arsenide of initial carrier concentrations ranging from $1\times10^8$ per cubic centimeter (semi-insulating sample) to $2.9\times10^{19}$ per cubic centimeter.

A plasmariton is the mixed excitation from which scattering occurs when a partially transverse and partially longitudinal hybrid plasmon (a collective excitation of charge carriers produced in the presence of a magnetic field) couples to the photon of like momentum to produce a mixed excitation. The mixed excitations, including plasmaritons and other excitations coupled to photons, whether occurring merely in the presence of a plasma or in the presence of both a plasma and a magnetic field, will be termed polaritons, even though a pure polariton has nothing to do with a plasma or the collective purely electronic excitations which occur in a plasma.

BRIEF DESCRIPTION OF THE DRAWING

Further features and advantages of my invention will be understood from the following detailed description, taken together with the drawing, in which.

DESCRIPTION OF THE ILLUSTRATIVE EMBODIMENTS

Figure 1:
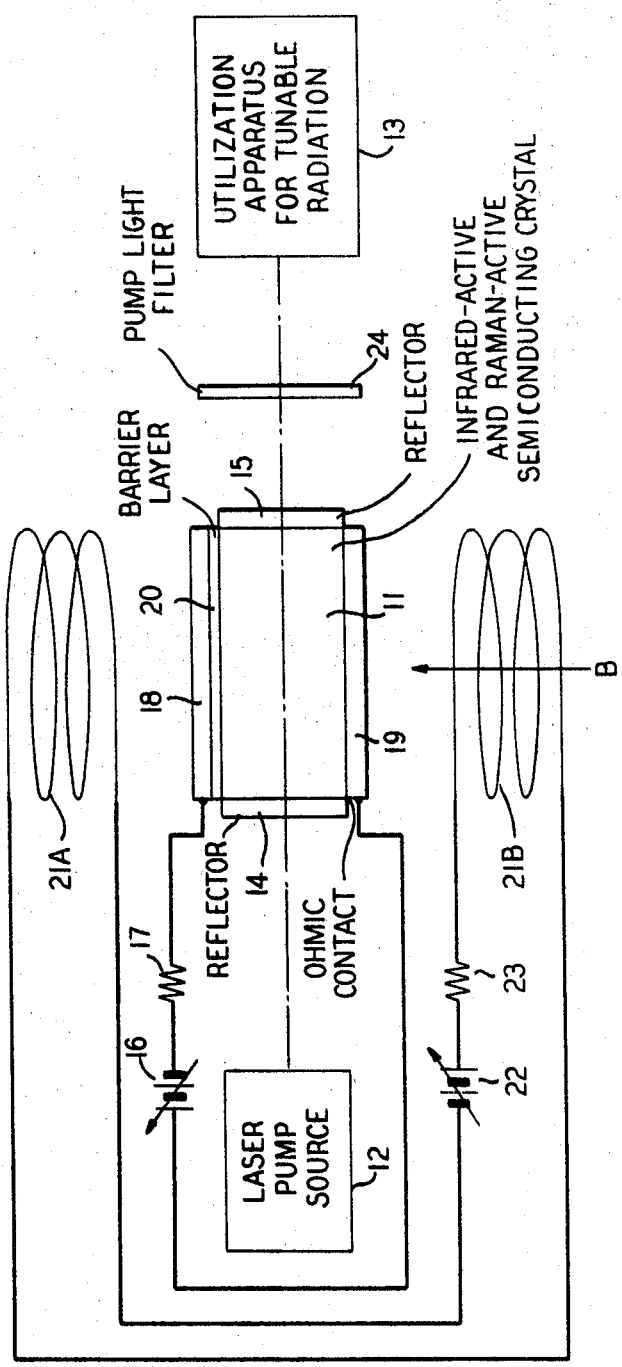
FIG. 1 is a partially pictorial and partially schematic illustration of a preferred embodiment of the invention.

In FIG. 1 it is desired to generate a tunable optical radiation in a semiconducting crystal 11 in response to coherent pumping radiation from a laser source 12. The output radiation from the crystal 11 is then utilized in apparatus 13, such as a heterodyne stage of an optical communication receiver. As is well known, a tunable local oscillator signal is highly useful for such applications.

The gallium arsenide crystal 11 is illustratively $n$-type with a carrier concentration of $1\times10^{10}$ per cubic centimeter and measures about 3 millimeters along each edge of its cubic body. Partially transmissive reflective coatings 14 and 15 of conventional type for the wavelengths of interest are disposed on opposed surfaces of crystal 11 along an axis colinear with the direction of propagation of light from laser pump source 12. A control electrode 19 makes ohmic contact to one lateral surface of crystal 11 and another control electrode 18 makes rectifying contact to crystal 11 through a thin oxide barrier layer 20, through which injection of carriers can occur.

A variable direct current source 16 and a resistor 17 are connected in series between electrodes 18 and 19 in order to provide means for changing the carrier concentration in crystal 11.

As a supplementary or alternative means for changing the frequency of the mixed excitation from which Raman scattering occurs, a magnetic field is applied through crystal 11 transverse to the direction of propagation of the pump light by a field coil including halves 21A and 21B disposed on opposite sides of crystal 11 and connected across a source 22 of variable direct current voltage and a resistor 23. The value of this field provides an additional control of the frequency, while the field itself varies over a wide range. In order for this field control to be effective, it is not necessary to inject carriers. For example, one could instead employ a more heavily doped sample, e.g., $3\times10^{17}$ per cubic centimeter.

The laser source 12 is illustratively a continuous wave solid state laser employing neodymium ions in a yttrium aluminum garnet host and operating at 1.06 microns. Preferably, it operates in a low-order transverse mode of the laser resonator in order to obtain an output beam divergence of less than 2 milliradian. In order for the crystal 11 to be substantially transparent to the pumping light, the photon energy of the pump light should be less than the band gap energy of crystal 11. This condition is clearly satisfied for the combination of neodymium ion laser and a gallium arsenide crystal. It may, in addition, be noted that in applications in which it is desired that the frequency of the output radiation be entirely independent of the pump light intensity, the photon energy of the light from source 12 should be less than one-half the band gap energy of crystal 11, or the intensity per unit area should be less than about $1\times 10^8$ per square centimeter. The significance of this relationship will become clearer hereinafter in connection with FIG. 2.

In the operation of the embodiment in FIG. 1, the intensity level of source 12 exceeds the threshold for stimulating Raman scattering from a mixed excitation (polariton) in crystal 11 along the axis of the optical resonator formed by reflectors 14 and 15. For any given carrier concentration in crystal 11 there exists a polariton of frequency such that the scattered light propagates colinearly with the pump light and is phase matched to the polariton and the pump light. Addition of carriers changes the wave vector of the polariton at a given frequency and causes a polariton of a different frequency to be phase matched to the pump and scattered light. In turn, the frequency of the scattered light will be equal to the frequency of the pump light minus the frequency of that polariton. Because of the phase matching and the resonating of the forward scattered light, the process becomes strongly regenerative. The scattered light that is resonated strongly then becomes stimulated or all in phase. A coherent light beam at that scattered light frequency is obtained as an output. If desired, any residual pump light not converted in crystal 11 may be filtered by a pump light filter 24 from the output beam before the output beam enters utilization apparatus 13. The frequency of the resonated scattered light, which is phase matched to the pump and polariton, is changed by changing the frequency of the phase-matched polariton.

It should be apparent from the preceding discussion that other effects which exert some control over the pertinent dielectric constants and, thus, over the frequency of the phase-matched polariton will provide a supplementary or vernier tuning effect. I have discovered that a variable magnetic field will provide an additional tuning effect of substantial magnitude.

A brief summary of the magnetic filed effect is as follows.

In presence of a magnetic field B such that $\underline{q} | \underline{B}$, where $\underline{q}$ is the wave vector of a polariton, the plasmon mode is no longer purely longitudinal because of $\underline{v}\times\underline{B}$ terms ($\underline{v}$ is the electron velocity) and the separation of the longitudinal and the transverse modes is not possible. Cyclotron effects are involved in the plasmon behavior. The scattering in this case arises from density fluctuations as well as from phonon contributions. Light scattering from free-charge carrier-density fluctuations accompanying this mixed cyclotron-plasmon-phonon-photon system can be best described by $$\frac{d^2\sigma}{d\Omega d\omega} = \left(\frac{\omega_s}{\omega_0}\right)^2 \left(\frac{\hbar}{\pi e^2}\right)(n(\omega)+1)xIm[\underline{q}\cdot\underline{\xi}^{-1}\cdot\underline{q}] \quad (1)$$

where $d^2\sigma/d\Omega d\omega$ is the scattering per unit of solid angle $\Omega$ and unit of frequency $\omega$, $\omega_s, \omega_o$ are the scattered and incident photon frequencies, $n(\omega)$ is the Bose-Einstein occupation number and $$\underline{\xi} = \frac{q^2 c^2}{\omega^2}\left(\underline{I} - \frac{\underline{qq}}{q^2}\right) - \underline{\epsilon} \quad (2)$$

where $\underline{I}$ is the identity matrix and $\underline{\epsilon}$ is the complete dielectric tensor. The $q$ is the wave vector of the mixed excitation. The free carrier contribution to $\underline{\epsilon}$ is given by simple Drude theory. The lattice contribution is diagonal and is given by equation 3 below. The partially transverse hybrid plasmon couple to the photon to give an additional splitting, the plasmariton, which is independent of phonons. Equation 1 give the correct positions of the scattering peaks, but to obtain the correct relative intensities along various branches of the dispersion curve one must include scattering mechanisms other than the density fluctuations such as the phonon-scattering mechanism.

A more detailed technical explanation of the tuning effect by variation of carrier concentration is as follows: In the previous optical Raman devices employing polariton effects, crystals with essentially no free carriers have been investigated.

The character of photon propagation is significantly modified when the effects of an electron (or hole) plasma are included. Below the plasma frequency, $\omega_p$, no photon propagation is possible since the propagation vector is purely imaginary. Nevertheless, at frequencies exceeding $\omega_p$, propagation of a mixed excitation consisting of photon, plasmon and phonon is possible under the conditions that the wave vectors $q$ and the frequencies, $\nu$, of the elementary excitations are nearly equal. The dispersion relation for this excitation is similar to that of a polariton but is modified by the presence of the plasma. Although Raman scattering from coupled plasmons and longitudinal optical phonons has been previously reported at large scattering angles, no coupling to the photon can be observed in such a case because of the disparity in the wave vectors of the photons and the excitations. In contrast, in the configuration of the present invention, scattering in the forward direction (within about 1° of colinearity with the pump) is being resonated and utilized, and the scattering effects of mixed excitations, herein termed polaritons, is thereby employed.

In absence of free carriers, the longitudinal dielectric constant is given by $$\epsilon(\omega) = \epsilon(\infty) + \frac{\epsilon(0) - \epsilon(\infty)}{1 - (\omega/\omega_{TO})^2} \quad (3)$$

where $\epsilon(\infty)$, $\epsilon(O)$ are the high frequency and static dielectric constants and $\omega_{TO}$ is the TO phonon frequency. In the presence of an electron plasma with a density $n$ cm.$^{-3}$, the dielectric constant can be modified by a simple Drude term so that $$\epsilon(\omega) = \epsilon(\infty) + \frac{\epsilon(0) - \epsilon(\infty)}{1 - (\omega/\omega_{TO})^2} - \frac{\epsilon(\infty)\omega_p^2}{\omega(\omega + i\omega_0)} \quad (4)$$

where $$\omega_p = \left(\frac{4\pi n e^2}{m^*\epsilon(\infty)}\right)^{1/2}$$

is the plasma frequency and $\omega_o$ is the characteristic relaxation frequency of plasma given by $\omega_o = 1/\tau_o$ ($\tau_o$ is the average collisional relaxation time for the electrons). In the absence of a magnetic field, the longitudinal and the transverse modes are separable and are given by $$\epsilon(\omega) = 0 \text{ for longitudinal modes} \quad (5) \text{ and}$$

$$\omega^2 = \frac{q^2 c^2}{\epsilon(\omega)} \text{ for transverse modes.} \quad (6)$$

Previously measured values of $\epsilon(\infty) = 10.719$, $\epsilon_{LO} = 291.9$ cm.$^{-1}$, $\epsilon_{TO} = 268.6$ cm.$^{-1}$ and $m' = 0.073\ m_0$ were used. Note that with no carriers, a photon couples with the transverse optical phonon when their energies and momenta are nearly equal and give the simple polariton dispersion relation investigated by a number of authors. Addition of carriers is seen to result in a coupling between the longitudinal plasmon and phonon and a modification of the polariton dispersion relation. Light scattering using a 1.06$\mu$source from these modes is restricted by energy-momentum conservation considerations to lie along curves 41—46 of FIG. 3 shown for various scattering angles.

Figure 3:
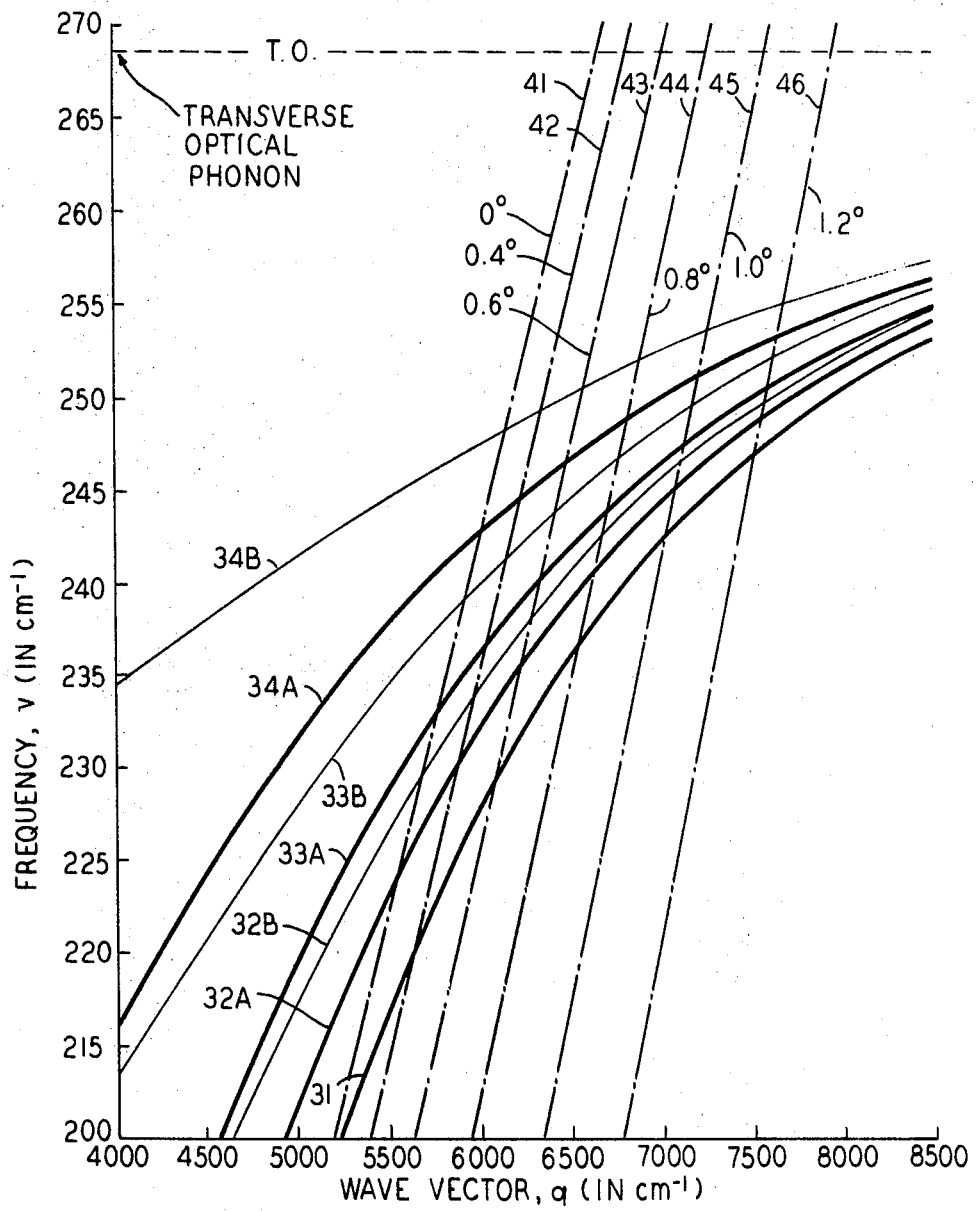
FIG. 3 shows curves which are helpful in understanding the theory and operation of the invention.

In particular, the details of the tuning can be more fully understood by reference to FIG. 3, which shows the frequency $\nu$ of the polariton in wave numbers along the vertical axis and the wave vector $q$ in wave numbers of the polariton along the horizontal axis. It will be observed that the frequencies of the transverse optical phonon in the crystal 11 is found near the top of the curves at a value of about 268 wave numbers. The darker curved lines, the number designations of which include a A, are representative of the frequency-momentum relationship for the phase-matched excitation for various gallium arsenide samples without any magnetic field applied. The lighter curved lines designated with the same number followed by a B represent the same relationship for the phase-matched excitation for the same samples with a magnetic field of 100 kilo-Oerstads. The straight sloping lines represent scattering angles with respect to the direction of propagation of the pump light in crystal 11. Thus, the preferred operating line is that shown by curve 41, which represents the condition of collinear propagation. The particular operating point along that line will, of course, be determined by the phase-matching condition, and is found at the intersection of the appropriate curve representing the prevailing carrier concentration and magnetic field. For example, in the specific case given for FIG. 1, operation will occur along curve 41 between curves 34A and 34B as the magnetic field is varied between 0 and 1000 kilo-Oerstads. As the carrier concentration is changed by injected current into sample 11 through barrier layer 20, curves 34A and 34B are no longer determinative of the operating point. Nevertheless, we can imagine that the curves which do determine the operating point are similarly shaped curves, slightly displaced in a direction appropriate for the change in carrier concentration. As curves 31, 32A, 32B, 33A and 33B show, a lower carrier concentration would drive the operation downward along curve 41 toward lower frequency of the mixed excitation and higher frequencies of the scattered light; the higher carrier concentration actually produced by carrier injection drives the operating point upward along curve 41 toward higher frequencies of the mixed excitation and lower frequencies of the scattered light.

Inherent in this arrangement is the possibility that, by resonating scattered light at a small angle with respect to the pump light direction, additional tuning can be achieved, even though tuning by this means is not considered highly desirable. Thus, with an angle of divergence between pump direction and the resonator axis of reflectors 14 and 15 equal to 0.4°, operation is obtained along curve 42 in FIG. 3. Similar operating lines 43 through 46 are shown for angles ranging up to 1.2°.

The carrier injection scheme illustrated in FIG. 1 is not the only way to change the carrier concentration and, consequently, the frequency of the mixed excitation involved in the Raman scattering in crystal 11. The carrier injection could, of course, be accomplished through a PN junction in the gallium arsenide. Such junctions are readily made in gallium arsenide, as is well known.

Figure 2:
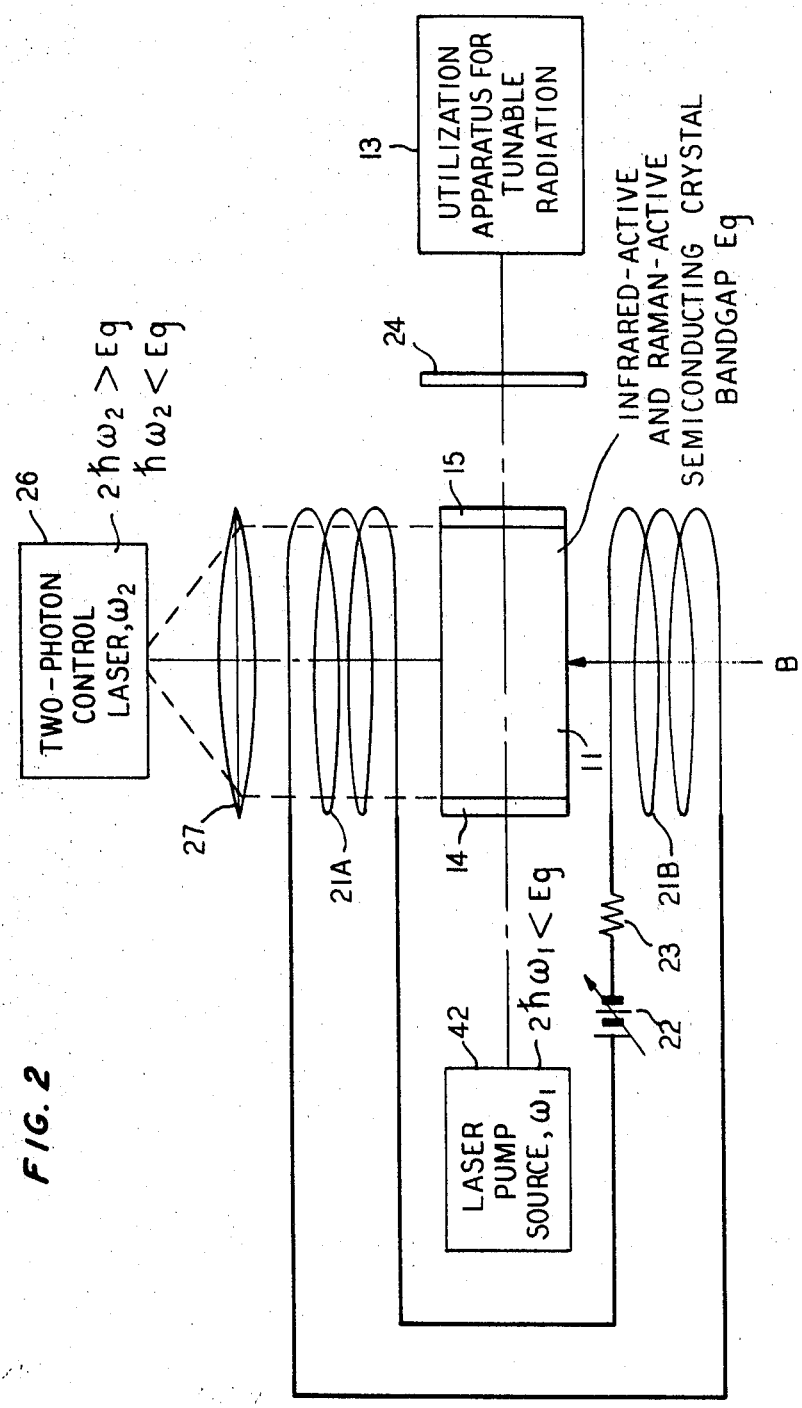
FIG. 2 is a partially pictorial and partially schematic illustration of a second embodiment of the invention employing control of carrier concentration by two-photon absorption.

In addition, carriers can be injected by two-photon absorption in the crystal 11, as shown in the modified embodiment of FIG. 2.

In FIG. 2 components like those of FIG. 1 are numbered the same as in FIG. 1. The laser pump source 42 is illustratively a carbon dioxide molecular laser, of type now well known in the laser art, operating at 10.6 microns in the far infrared. The photon energy of this radiation is less than one-half the band gap energy $E_g$ of the gallium arsenide crystal 11. Thus, $$2\hbar\omega_1 < E_g \qquad (7)$$

This provision is made so that no two-photon absorption of the pumping radiation can occur, regardless of its intensity.

Simultaneously, additional light at a higher frequency $\omega_2$ is applied transversely to crystal 11 from a control laser 26 of variable intensity through a collimating lens 27, which applies a broad parallel beam of the light to crystal 11. This beam extends between reflectors 14 and 15 and fills the crystal substantially uniformly. Its intensity per unit area is in the range of $10^8$ watts per square centimeter. At this intensity level substantial two-photon absorption will occur in the gallium arsenide, if twice the photon energy of the laser radiation is greater than the band gap of crystal 11;

$$2\hbar\omega_2 > E_g \qquad (8)$$

Two-photon absorption produces additional carriers by producing electron-hole pairs. In order that the laser radiation from laser 26 can extend through the crystal 11, it is also desirable that the energy of a single photon is less than the band gap energy, $$\hbar\omega_2 < E_g \qquad (9)$$

Thus, the laser 26 can be a high-power neodymium ion laser or an array of such lasers operating at 1.06 microns and providing the required intensity per unit area.

In operation as the intensity of light from laser 26 is varied, the amount of two-photon absorption varies. The frequency of the mixed excitation from which Raman scattering occurs will carry in dependence upon the carrier concentration in a manner which may be determined from FIG. 3 for the 0° scattering angle (curve 41). For a given value of the carrier concentration thus achieved, two-photon absorption is entirely equivalent to other forms of carrier injection, e.g., that of FIG. 1, for the purposes of the invention. The two-photon source light need not be coherent.

As a further consequence of this similarity in operation, the effect of variation of the magnetic field applied by coil 21A, 21B to crystal 11 will be the same as in the embodiment of FIG. 1, as heretofore explained with reference to FIG. 3.

The range of initial carrier concentrations of crystal 11 usable in the present invention extend from $1\times10^{10}$ per cubic centimeter to $1\times10^{19}$ per cubic centimeter. The magnetic fields may vary from 0 to values as great as can be practically achieved, e.g., several hundred kilo-Oersteds.

It should be understood that variation in temperature will have some effect, not necessarily deleterious, upon the tuning and range of tuning of the disclosed embodiments of the invention and that some tuning by rotation of a crystal through angles of the order of 1° is also feasible as a supplement to the technique of the invention. It should be noted that the reference to substantial colinearity between the pumping light and the scattered light comprehends the possible angular deviation therebetween of about 1°. It should be clear that many other semiconducting crystals can be used in the present invention. The preferable ones are those which have both Raman active and infrared active phonons and which are transparent to the optical frequencies employed.

By employing the term polariton, we do not wish to limit our invention to only those mixed excitations which have currently been reported in the literature; but use the term generically for all mixed excitations in which a photon is involved. The term plasmariton ordinarily has an independent meaning in the art and has been used above, even though it falls within our generic definition of a polariton.

I claim:

1. A coherent optical oscillator apparatus comprising a semiconductive body that has phonons which are both Raman-active and infrared-active, means for supplying coherent optical pumping radiation along a first axis extending through said body, means for resonating radiation scattered from a mixed excitation in said body along a second axis substantially collinear with said first axis, said resonated scattered radiation being phase matched to said pumping radiation and said mixed excitation, and means for varying the frequency of said excitation in said body to vary the frequency of said resonated scattered radiation.

2. A coherent optical oscillator apparatus according to claim 1 in which the means for varying the frequency of the mixed excitation comprises means for injecting carriers into said body.

3. A coherent optical oscillator apparatus according to claim 2 in which the injecting means includes a rectifying junction on said body, and means for supplying current through said rectifying junction.

4. A coherent optical oscillator apparatus according to claim 2 in which the means for injecting carriers comprises a source of radiation of frequency and intensity suitable for two-photon absorption in said body, said radiation being supplied substantially uniformly throughout the scattering path in said body.

5. A coherent optical oscillator apparatus according to claim 1 in which the means for varying the frequency of the mixed excitation comprises means for supplying a variable magnetic field through said body orthogonal to the first axis.

6. A coherent optical oscillator apparatus according to claim 5 in which the means for varying the frequency of the mixed excitation includes means for injecting a variable number of carriers into said body, said field and said variable number of carriers being effective in varying the frequency of said mixed excitation.

7. A coherent optical oscillator apparatus according to claim 6 in which the means for injecting carriers comprises a laser having a photon energy greater than one-half the bandgap energy of the semiconductive body, said photon energy being less than said bandgap energy, the means for supplying pumping radiation providing a photon energy of said pumping radiation which is less than one-half the bandgap of said semiconductor body.

8. A coherent optical oscillator apparatus according to claim 6 in which the means for injecting carriers comprises a first electrode making ohmic contact to said body, a second electrode, a barrier layer separating said second electrode from said body, and a source of variable electrical current connected across said first and second electrodes.

9. A coherent optical oscillator apparatus according to claim 3 in which the rectifying junction comprises a barrier layer on said body and the current-supplying means comprises a first electrode making ohmic contact to said body, a second electrode separated from said body by said barrier layer, and a source of variable electrical current connected across said first and second electrodes.

10. A coherent optical oscillator apparatus according to claim 4 in the source of radiation for two-photon absorption comprises a laser having a photon energy greater than one-half the bandgap energy of the semiconductive body, said photon energy being less than said bandgap energy, the intensity of said radiation from said laser being at least of the order of $1 \times 10^8$ watts per square centimeter at a surface of said body.